(12) United States Patent
Alsbury et al.

(10) Patent No.: US 8,368,699 B2
(45) Date of Patent: Feb. 5, 2013

(54) DISPLAYING BAR CHARTS WITH A FISH-EYE DISTORTION EFFECT

(75) Inventors: Quinton Alsbury, Venice, CA (US); David Becerra, Venice, CA (US)

(73) Assignee: MeLLmo Inc., Solana Beach, CA (US)

( * ) Notice: Subject to any disclaimer, the term of this patent is extended or adjusted under 35 U.S.C. 154(b) by 986 days.

(21) Appl. No.: 12/392,974

(22) Filed: Feb. 25, 2009

(65) Prior Publication Data

US 2010/0214300 A1 Aug. 26, 2010

(51) Int. Cl.
*G06T 11/20* (2006.01)
(52) U.S. Cl. .................................................. 345/440.2
(58) Field of Classification Search .............. 345/440, 345/440.1, 440.2; 715/215
See application file for complete search history.

(56) References Cited

U.S. PATENT DOCUMENTS

| | | | | |
|---|---|---|---|---|
| 6,229,536 | B1* | 5/2001 | Alexander et al. | 345/440.1 |
| 6,972,763 | B1 | 12/2005 | Millett et al. | |
| 2002/0063712 | A1* | 5/2002 | Ilic | 345/440 |
| 2004/0090573 | A1 | 5/2004 | Fairhurst et al. | |
| 2005/0275622 | A1 | 12/2005 | Patel et al. | |
| 2007/0273694 | A1* | 11/2007 | Dobyns et al. | 345/440.1 |

OTHER PUBLICATIONS

Manojit Sarkar and Marc H. Brown, Graphical Fisheye Views of Graphs, May 1992, Proceeding CHI '92, Proceedings of the SIGCHI conference on Human factors in computing systems, ACM, pp. 83-91.*

Emden R. Gansner, Yehuda Koren, and Stephen C. North, Topological Fisheye Views for Visualizing Large Graphs, Jul./Aug. 2005, IEEE Transactions on Visualization and Computer Graphics, vol. 11, Issue: 4, pp. 457-468.*
Christian Tominski, James Abello, Frank van Ham, and Heidrun Schumann, Fisheye Tree Views and Lenses for Graph Visualization, 2006, Tenth International Conference on Information Visualization,2006, IV 2006, pp. 17-24.*
Ajaxdaddy.com, "Dojo Fisheye Examples: Dojo Fisheye,",[Online] [Retrieved on Jun. 11, 2010] Retrieved from the Internet <URL:http://www.ajaxdaddy.com/demo-dojo-fisheye.html>.
PCT International Search Report and Written Opinion, PCT Application No. PCT/US2010/022615, Apr. 8, 2010, 6 pages.
Hotdreamweaver.com, "Fish Eye Menu: Dreamweaver Extension for MX and Later Versions," [Online] [Retrieved on Jun. 10, 2010] Retrieved from the Internet <URL:http://www.hotdreamweaver.com/fish-eye-menu>.
Wikipedia.org, "Dock (Mac OS X)," [Online] [Retrieved on Jun. 10, 2010] Retrieved from the Internet <URL:http://en.wikipedia.org/wiki/Dock_(Mac_OS_X)>.

* cited by examiner

*Primary Examiner* — Jeffery A Brier
(74) *Attorney, Agent, or Firm* — Fenwick & West LLP

(57) ABSTRACT

A system and a method are disclosed for visually displaying data points using charts on a display screen with limited display area. A fish-eye distortion region allows presentation of detailed information for some data points compared to other data points that are displayed. The chart can be moved relative to the distortion region thereby changing the data points displayed within the fish-eye that present additional information. The relative movement between the chart and the distortion region is triggered by different kinds of inputs from the user including, tilting of the device, swiping with a pointing device and selecting a particular data point.

29 Claims, 10 Drawing Sheets

DISPLAYING BAR CHARTS WITH A FISH-EYE DISTORTION EFFECT

BACKGROUND

1. Field of Art

The disclosure generally relates to displaying reports on a device having a display area that is small relative to the amount of data that is being displayed.

2. Description of the Related Art

There are several ways of using charts or graphs to visually present statistical data available in reports including, for example, bar charts, pie charts, line graphs, and scatter graphs. On a mobile device such as a handheld device, handheld computer, cell phone, tablet computer, or personal digital assistant (PDA), graphs and charts have to be displayed on small display screens with display areas that are limited in size compared to the data being shown. There are several challenges in trying to show graphs and charts on such devices. For example, FIG. 1 illustrates some of the obstacles encountered in displaying a bar chart on a small screen. The height of each bar 100 in the bar chart is proportional to the y-coordinate value represented by the bar. Due to the fixed resolution of typical display screens, two values that are very close may be represented by bars appearing to have the same height. Hence, the height of the bars may not truly represent the corresponding y-coordinate value. In addition, it is difficult for a viewer to know the exact y-coordinate value corresponding to each bar.

SUMMARY

The present invention enables the display of chart type data on a device having a display area that is small compared to the amount of data being shown in the chart. Examples of suitable devices include tablet computers, smart phone devices, and mobile phones. A fish-eye magnification area (also referred to as fish-eye or fish-eye distortion region or distortion region) allows a portion of a chart or graph data to be displayed at a larger size and to include additional information compared to the graphic data displayed outside the distortion region. The distortion region displays data points with varying levels of magnification. The level of magnification of a data point determines the size of the graphical representation of the data point and the amount of information displayed for the data point. Data points displayed with high magnification display more information and are represented using larger images compared to data points displayed at lower magnification. The distortion region has a portion that displays maximum magnification and the magnification decreases with distance of the data points from the portion displaying maximum magnification. The location of either the chart or the distortion region can be moved to view detailed information for different portions of the chart. Navigation mechanisms allow a user to efficiently reach a particular set of adjacent data point that the user wants to magnify.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 2:
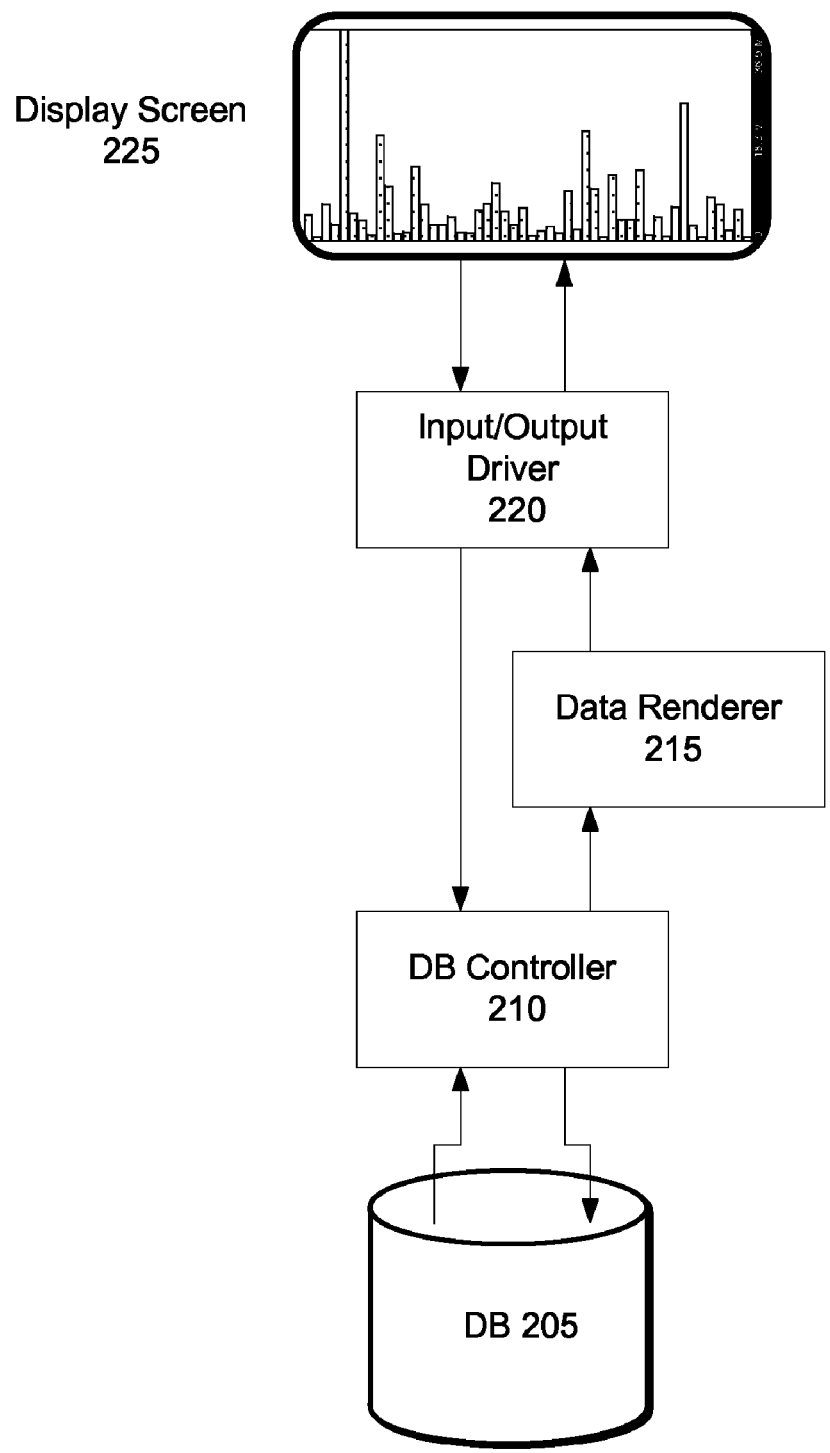
FIG. 2 illustrates one embodiment of the architecture of a system for displaying data as bar graphs.

FIG. 2 is a block diagram of a system architecture in accordance with one embodiment. The components shown in FIG. 2 include a database (DB) 205, a DB controller module 210, a data renderer module 215, an input/output driver module 220, and a display screen 225. Components such as the display screen 225 are hardware components whereas the DB controller 210 and the chart renderer 215 are software modules. As used herein, the term "module" refers to a computer program logic and/or data for providing the specified functionality. A module can be implemented in hardware, firmware, and/or software. Examples of types of computers that implement the system shown in FIG. 2 include tablet computers, smart phone devices, and mobile phones.

The DB 205 stores data and metadata associated with reports. The DB 205 in one embodiment is implemented using a hard disk drive but can also be implemented using any other device capable of storing data, such as a writeable compact disc (CD) or DVD, or a solid state memory device, for example a flash memory. The DB controller module 210 implements the logic to interface with the DB 205 so as to read data from the DB 205 or write data to the DB 205. The DB controller 210 provides data to the data renderer module 215, which computes information required for rendering the data. For example, the data renderer can determine the dimensions of a pie chart if the data needs to be displayed as a pie chart. The data and the information necessary for rendering the data are provided by the data renderer 215 to the input/output driver 220. The input/output driver 220 provides the display screen 225 with instructions and data necessary for displaying data and/or images. In various embodiments, the display screen 225 is used to input data and/or commands. For example, a touch sensitive screen can sense the coordinates of the portion of the screen touched by a user. The user may touch the display screen 225, for example, to select a command from a list of commands or to select a data element from a list of data elements displayed on the screen. In various embodiments, the display screen 225 can be tilted by the user. The magnitude and direction of tilt of the display screen 225 is detected and can be treated as an input. The angle of the tilt of the display screen is provided to the input/output driver 220 by hardware components such as an accelerometer. In some embodiments, a pointing device, such as a thumbwheel, mouse, track ball, or other type of pointing device is used to input data or commands into the system. The input/output driver 220 sends the data or instructions provided by the display screen 225 to the DB controller 210. The DB controller 210 in response to data or instructions received from the input/output driver 220 reads data from DB 205 and writes data to DB 205.

A mobile device may be used to view reports available to a user. An example scenario allows the user to associate a particular report with a display mode, such as a pie chart, bar chart, or text mode. To allow the user to create an association between the report and a display mode, the user is presented with a list of display modes. The user may make a selection by touching the appropriate portion of the display screen 225 showing a specific mode of display, or by providing input through another mechanism such as a keyboard or pointing device. The DB controller 210 updates the metadata of the appropriate report in the DB 205 to store the information related to mode of display of the report. The information associating the report with a mode of display is used subsequently to display the report.

In another scenario, the user may be presented with a list of reports that can be reviewed. The user selects a particular report name and data renderer 215, computes information to render the data which is then displayed on display screen 225 in the specified format. Various other scenarios of interactions between the user and the various components and modules displayed in FIG. 2 are possible.

Figure 3:
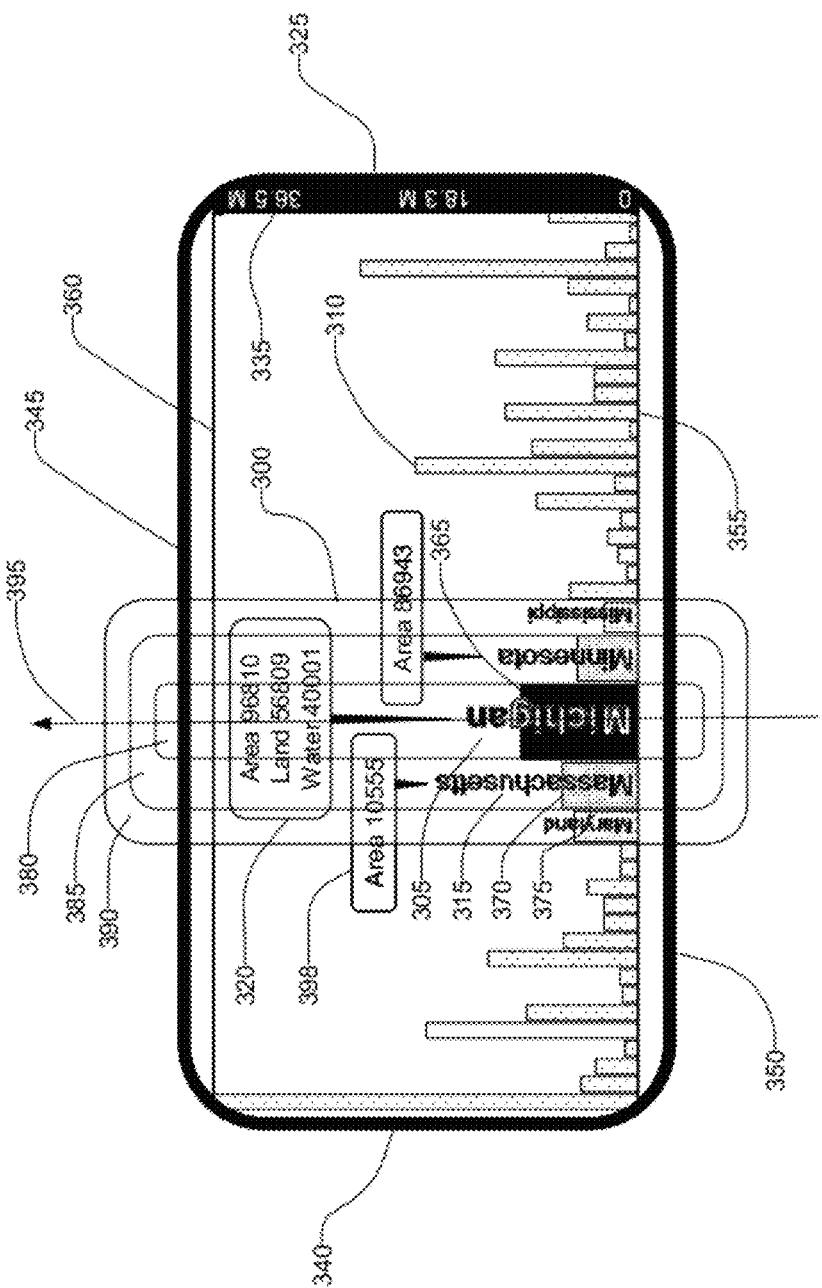
FIG. 3 illustrates how bars are displayed with varying levels of magnification in the distortion region.

FIG. 3 illustrates how a distortion region 300 can be used on a display screen 225 to effectively present a visual representation of a report such as a bar chart. In some embodiments, the entire chart is displayed on the display screen 225 with a portion of the bar chart magnified by the distortion region 300. Displaying the entire bar chart allows the user to view the overall trend of data values in the chart while viewing details of a portion within the distortion region 300. The display screen comprises four edges, a left edge 340, a right edge 325, a top edge 345, and a bottom edge 350. Note that the naming of an edge, e.g., as a "bottom", is for clarity of description—a particular device may support use in multiple orientations, in which case the physical edge of the device that is the "bottom" or "top" in one orientation can easily become a different edge in an alternative orientation. Our description here is not intended to be limited to a particular orientation.

The x-axis is shown adjacent to the bottom edge 350 and the values 335 corresponding to the y-axis are shown adjacent to the right edge 325. The chart is displayed in an area enclosed within the edges of the display screen. For example, in FIG. 3 the chart area is within the lower chart edge 355 and an upper chart edge 360. A bar displayed within the distortion region 300 is called a magnified bar 315 and a bar displayed outside the distortion region 300 is called a standard bar 310. The magnified bar 315 can display more information 320 related to the data point corresponding to the bar compared to a standard bar. Also, a magnified bar is displayed with a bar larger than or at least as large as the standard bar. The x-axis values 305 are shown overlapping with each magnified bar 315. In one embodiment, the distortion region 300 is a rectangular area with height at least as large as the maximum bar height in the graph and a width at least as large as a standard bar 310. The width of the magnified bar 315 is larger than the width of a standard bar 310 to allow information to be displayed for the magnified bar. For example, in FIG. 3, the text 305 "Michigan" corresponding to the x-axis value of the data point represented by the magnified bar 315 is displayed overlaying with the magnified bar 315. Additional information related to the data points may be displayed as popup 320, 398.

Data points within the distortion region 300 are displayed with varying levels of magnification. The level of magnification of a bar determines the size of the bar as well as the amount of information displayed for the data point corresponding to the bar. A bar displayed with high magnification displays more information and is represented using a larger image compared to bars displayed at lower magnification. A distortion axis 395 can be considered passing through the center of the distortion region 300 and parallel to the bars. The magnification of bars closest to the distortion axis 395 is highest and reduces as the distance of the bars from the distortion axis 395 increases. Alternatively, the distortion region can be divided into multiple concentric regions, with magnification of data point in the innermost region being the highest and reducing for regions going outward from the innermost region. For example, the distortion region 300 as shown in FIG. 3 has three concentric regions, the innermost region 380, the region 385 that surrounds region 380, and the region 390 that surrounds region 385. The magnification of bars within the region 380 is the highest, followed by the magnification of bars in 385, followed by the magnification of bars in region 390 that is the lowest of the magnification in the three regions. The magnified bar 365 displaying "Michigan" is in the region 380 and shows the maximum magnification. Hence, bar 365 is the widest bar displayed in the distortion region 300 and also displays the maximum information associated with the data point including the label 305 and additional information 320 such as data values corresponding to area, land and water. The bar 370 displaying "Massachusetts" is farther away from the distortion axis 395 compared to bar 365 and lies in the region 385. Hence the magnification of bar 370 is less than the magnification of bar 365. The information 395 displayed for bar 370 is less than the information displayed for bar 365 and only the label 315 and the data value corresponding to area is displayed. The width of the bar 370 is less than the width of the bar 365 and the font size used for displaying the label 315 in bar 370 is smaller than the font used in bar 365. Similarly the magnification of bar 375 is less than the magnification of both 365 and 370 since 375 is farther away from the center of the distortion region 300 along the x-axis compared to 365 and 370 and lies within the region 390. Also, the information displayed for bar 375 is less than the information displayed for 365 and 370 since only the label is displayed. The magnification level of the bars is distributed symmetrically around the distortion axis 395. Hence bars at the same distance along the two sides of the distortion axis are magnified at the same level. In some embodiments, the distortion axis 395 may not pass through the center of the distortion region but may be closer to one of the sides. The magnification of bars in such distortion region may not be distributed symmetrically around the distortion axis.

Figure 4:
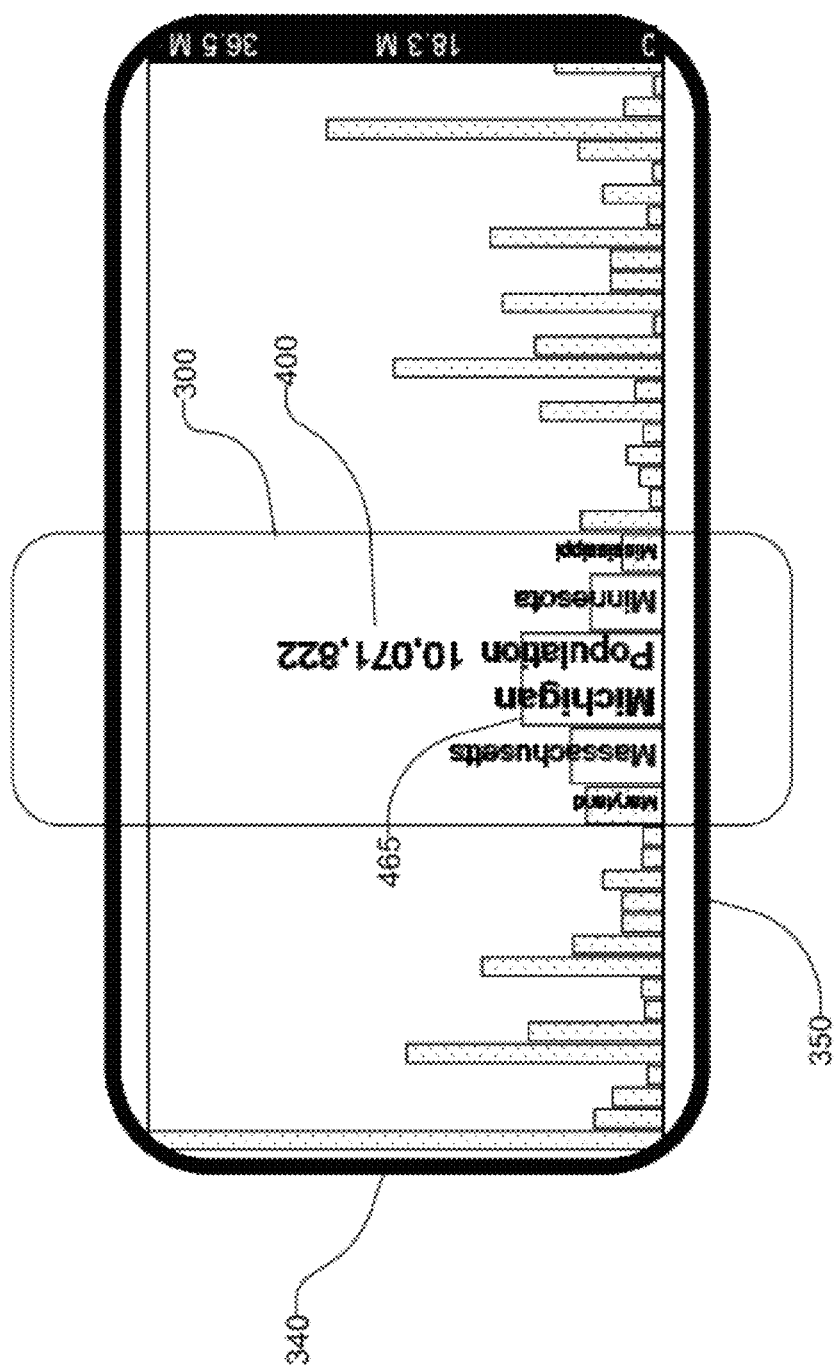
FIG. 4 shows a distortion region displaying additional information for a magnified bar using text that overlaps with the bar.

FIG. 3 displays five magnified bars within the distortion region 300. Other embodiments can display more or less number of bars within the distortion region. The number of bars displayed within the distortion region can be configured by the user. Also, the number of bars displayed in each magnification region 380, 385, and 390 may be different for different embodiments. FIG. 4 illustrates an alternative embodiment that displays additional information 400 for the magnified bar 465 as a label overlapping with the bar. In one embodiment, bars are displayed in a different color or with different shading within the distortion region 300 based on the distance of the bars from the center of the distortion region 300 along the x-axis. For example, bars closer to the center of the distortion region 300 can be displayed with darker shading compared to bars away from the center of the distortion region. Alternatively, if the distortion region can be considered divided into multiple regions, the color or shading of the bars may depend on the region in which the bars are drawn.

The user is provided with mechanisms to move the bar chart relative to the distortion region 300 to be able to magnify different sets of bars. This may involve either keeping the distortion region 300 stationary and moving the chart, or keeping the chart stationary while moving the distortion region 300 or moving both. For example, the user may point at a region outside the distortion region 300 and swipe along the x-axis causing the bar chart to move along the x-axis while the distortion region 300 stays in the same region of the display screen 225. Alternatively the user may point within the distortion region 300 and move the pointing device causing the distortion region 300 to move relative to the bar chart. The movement of the bar chart relative to the distortion region 300 causes different bars to pass through the distortion region 300. Each bar that passes under the distortion region 300 gets magnified and displays additional information compared to bars outside the distortion region 300. The magnification level of the bar increases as it gets closer to the distortion region axis 395 and then reduces as the bar moves away from the distortion axis until it moves outside the distortion region and is displayed as a standard bar 310. In one embodiment, the transition from a standard bar to a magnified bar is animated to display bars of different sizes in between the standard bar size and the magnified bar size. Another embodiment displays the transition directly from the standard bar to the magnified bar or from magnified bar to standard bar without displaying any intermediate stages. In one embodiment, the user can customize the animation settings; alternatively they may be determined automatically according to device type or graphical capabilities.

FIG. 3 also illustrates how the labels corresponding to the x-axis values are displayed in one embodiment for the magnified bars. As shown in FIG. 3, the labels for the x-coordinate values of the magnified bars are shown above the line displaying the x-axis 355 and parallel to the y-axis. Depending on the value of the y-coordinate and the size of the text corresponding to the x-coordinate value, the bar may be taller than the label or shorter than the label. The portion of the label that overlaps with the bar is displayed in inverse or other color that makes it easy to view the text within the bar, for example, the letters "Michig" corresponding to the x-coordinate value Michigan for the magnified bar 315 are displayed using white colored text against the dark background of the color of the bar. The portion of the label that extends beyond the bar height is displayed using a color that distinguishes it against the background of the bar chart, for example, the text "an" that forms the suffix of label Michigan is displayed using a dark color against the light background of the bar chart. Alternative embodiments may display the label 305 along with the additional information displayed as popup 320.

Figure 5:
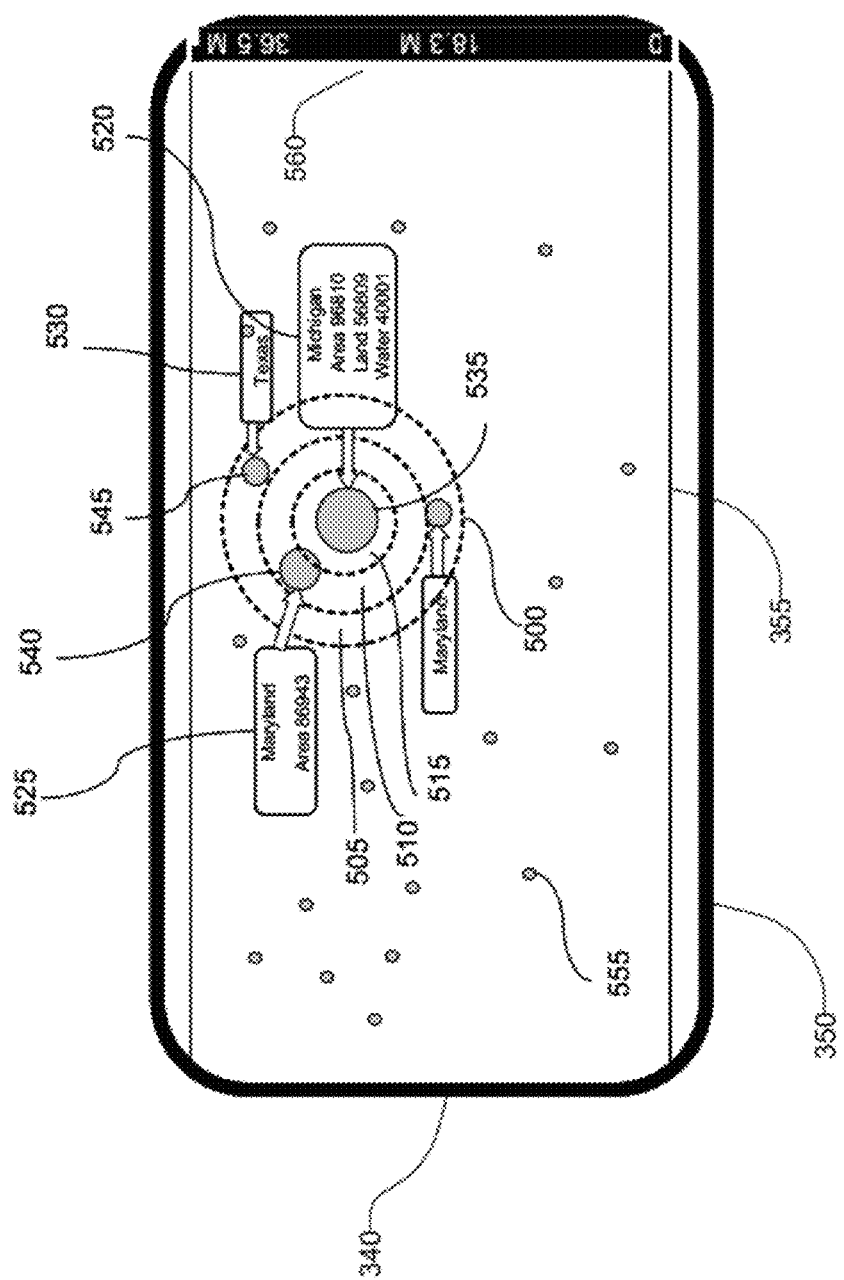
FIG. 5 illustrates how a scatter graph can be displayed effectively using a distortion region.

The distortion region 300 can be used with other kinds of charts, for example, line charts, two dimensional charts displaying data points such as a scatter plot. FIG. 5 shows a two dimensional chart displaying data points with a distortion region. The circle 500 represents the overall distortion region. The circular region 515 is the innermost portion of the distortion region 500 that causes the maximum magnification of data points. Data point 535 falls within region and hence is displayed with the largest icon compared to other data points and with the most amount of information 520. The region 510 represents the region with relatively lower magnification compared to region 515. Data point 540 that falls within the region 515 has an icon size less than icon for 535 and information 525, less than information 520 for data point 535. Similarly the region 505 represents magnification lower than both regions 510 and 515 described above. The data point 545 within region 505 displays the least magnification compared to data points 535 and 540 and displays the least amount of information 530. The magnification level of a data point that falls in two different regions with different magnifications is determined by the region that it predominantly falls under with a tie resolved arbitrarily. The user can change the magnification of the data point by moving the distortion region 500 relative to the data point.

In FIG. 5 the standard data points 555 outside the distortion region 500 do not display any additional information. An alternative embodiment may show some information for standard data points 555 that is less than information displayed for magnified data points. Alternative embodiments may display more or less number of regions with different magnification within the distortion region 500 as compared to FIG. 5. The shape of a distortion region for a particular kind of chart is determined based on the shape of the underlying chart to provide a better viewing experience for the user. For example, the shape of distortion region for a circular chart such as a Smith chart may be circular or rectangular. The shape of the distortion region 500 in FIG. 5 is suitable for displaying data points on a two-dimensional scatter graph and is different from the shape of distortion region 300 in FIG. 3 suitable for displaying bar charts. Alternative embodiments may change the magnification uniformly with the distance of the data point from the center of the distortion region or from another point within the distortion region instead of dividing the distortion region into multiple regions with discrete levels of magnification.

The chart in FIG. 5 can be moved relative to the distortion region 500 along both x-axis and y-axis to magnify different sets of adjacent data points. The user can indicate the direction of movement of the chart relative to the distortion region 500, for example, by tilting the device along the x-axis 355 or y-axis 560 or an angle between the two axes. Based on the angle of tilt, the direction of movement of the chart is determined. Alternatively, the user can indicate the desired direction of chart movement by swiping across the screen in the desired direction.

The user can navigate across different portions of a chart to magnify and view details with the help of distortion region 300. The user is able to bring different parts of the chart under the distortion region 300 by providing input that causes the chart to move relative to the distortion region 300. For example, a standard bar displayed on the display screen 225 can be brought under the distortion region 300 by clicking on the standard bar. In an alternative embodiment, the distortion region 300 may be moved from one portion of the display screen to another portion so as to bring a desired standard bar within the distortion region. The distortion region is moved by selecting a bar within the distortion region and moving the pointing device along the x-axis.

Figure 1:
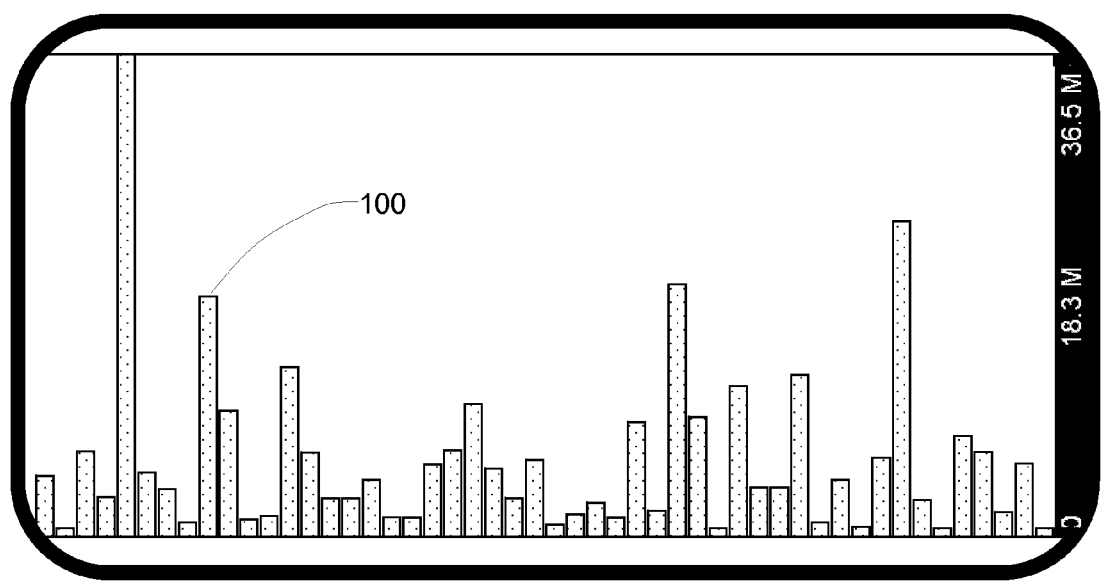
FIG. 1 illustrates a conventional system displaying a bar graph.
Figure 6:
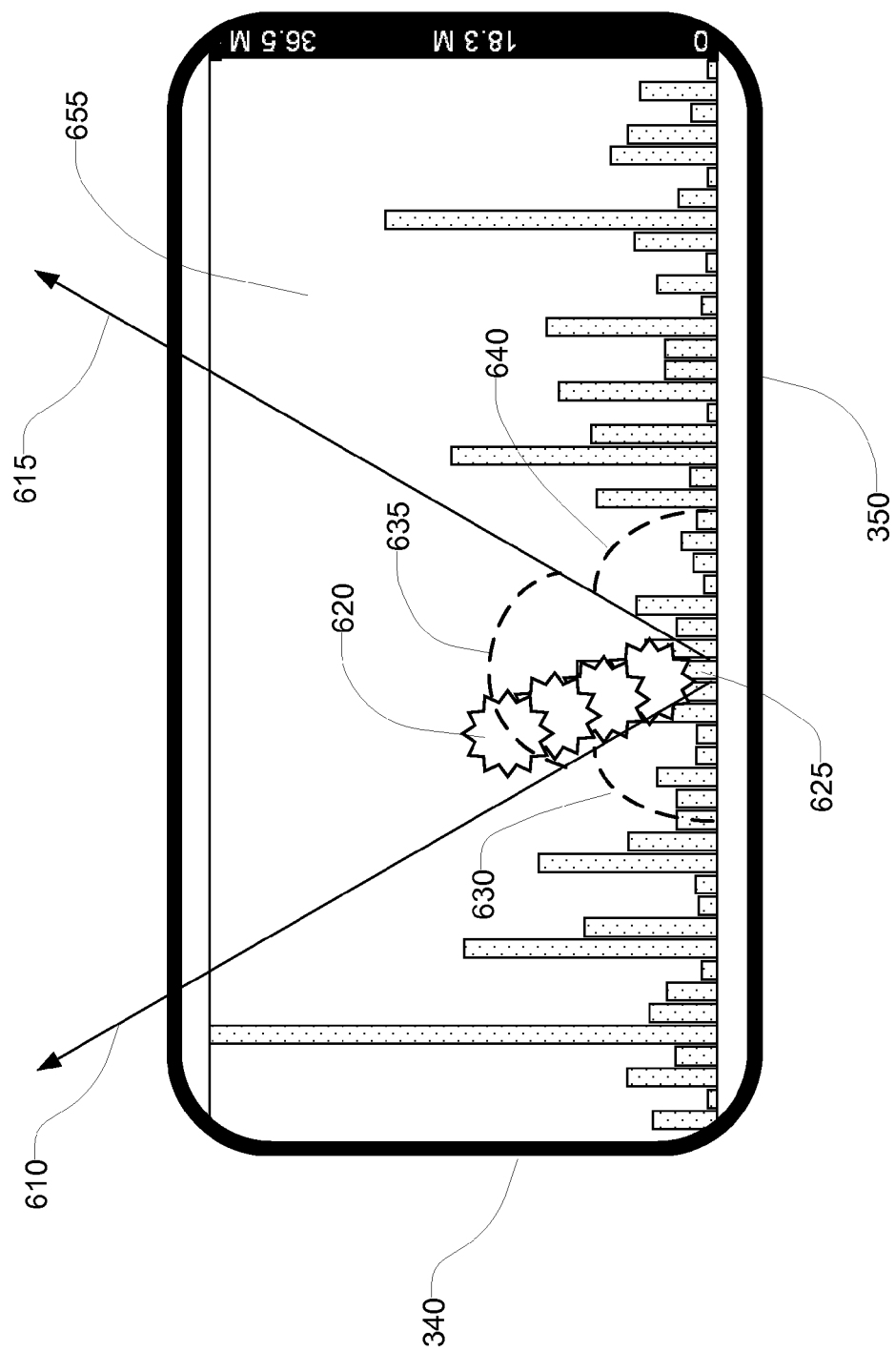
FIG. 6 illustrates how a bar chart displaying a distortion region can be changed to the default display of the bar chart.

Once the user has selected a standard bar causing the distortion region to appear, the distortion region continues to appear even if the user disengages the pointing device from the screen. For example, if the distortion region was engaged by touching the display screen with a finger in a particular region, the user may disengage by removing the user's finger from the screen. Alternatively, the user may have engaged the distortion region with a pointing device by pressing a button on the pointing device, and the user may disengage by releasing the button on the pointing device. The distortion region continues to display even after the user has disengaged from the distortion region. The user can cause the distortion region to move to a different region by engaging a different portion of the bar chart. For example, the user who engaged the distortion region by touching a portion of the display screen displaying a standard bar causes the distortion region to move by moving the user's finger along the x-axis while continuing to touch the screen. As the user moves the user's finger along the x-axis while the user is touching the display screen, the distortion region follows the user's finger. The distortion region follows the user's finger if the finger is moved within a predetermined angle of the x-axis. For example, as shown in FIG. 6, if the finger is moved from the bar 625 towards left of bar 625, within the angle 630 formed by the x-axis and the arrow 610, the distortion region moves to the left. Similarly, if the finger is moved to the right of bar 625 within an angle 640 formed by the x-axis and arrow 615, the distortion region moves to the right. To change a chart displaying distortion region to the default display as shown in FIG. 1 without a distortion region the user engaging the distortion region moves the pointing device used to engage the distortion region within a predetermined angle away from the x-axis towards a neutral region 655 that is not displaying bars. As shown in FIG. 6, if the user moves the finger away from the x-axis within the angle 635 formed by the arrows 610 and 615, as indicated by the selected regions 620, the distortion region is not displayed and the default display of the bar chart similar to FIG. 1 is shown without the distortion region. Alternative embodiments can cause a chart displaying distortion region to change to the default view shown in FIG. 1 responsive to the user selecting a neutral region 655 of the bar chart that is not displaying a bar.

In some embodiments, user input, for example double clicking on a particular bar within the distortion region causes additional detailed information to be displayed for the selected data point. For example, a new bar chart can be displayed wholly or partially over the original chart. The new bar chart displays information specific to the data point selected, and employs a distortion region as described above to view details of data points on the new chart. Additional layers of charts may be viewed in the same manner, allowing a user to drill down on data sets while still preserving the benefits of a distortion region. For example, the original bar chart may display information related to states of a country and selecting a bar may display a new bar chart having information related to counties within the selected state. The user may then select a bar associated with one of the counties to display a bar chart specific to that county, for example a bar chart displaying information related to parks within the county. The bars of the new bar chart can be displayed with a color or shading distinguishing them from the bars of the original bar chart. The user can further provide input to close a detailed bar chat to return to the bar chart displayed previously. The mechanism can be used to display multi-dimensional charts by displaying a particular dimension and allowing the user to select a data point to view information for the selected data point along a different dimension.

For charts that are bigger than the display area, not all bars are visible at the same time on the display screen 225 for the user to select. The user is provided with mechanisms to scroll the bar chart to see parts of the bar chart outside the display area. One embodiment allows the user to scroll the bar chart by selecting a standard bar and dragging the bar with a swiping motion of the pointing/selecting device in a particular direction. Another embodiment allows the user to swipe across any area of the display screen to scroll the bar chart. The direction of swiping indicates the direction in which the user wants the bar chart to scroll. In some embodiments, the distance the bar chart moves is determined by the distance of the swiping motion by the user. In another embodiment the distance the bar chart moves is determined by the speed of the swiping motion, such that swiping faster causes the bar chart to move larger distances. In yet another embodiment, the swiping action by the user may cause the bar chart to start scrolling continuously until the user provides input indicating the user wants the bar chart to stop scrolling. The user may cause the bar chart to scroll until a desired bar is in the display area. Once the desired bar is in the display area, it may be magnified by moving the distortion region to the bar, unless the bar is already in the distortion region 300. If the scrolling of the bar chart causes the bar chart to reach an end of the chart, the chart stops scrolling since no new bars can be displayed by continuing the scrolling. The ends of the bar chart correspond to the smallest and the largest x-coordinate values for which the bar chart is intended to be displayed. Once the scrolling is stopped when the user input causes the bar chart to reach an end of the bar chart, the user can cause the bar chart to scroll in the opposite direction.

Figure 7:
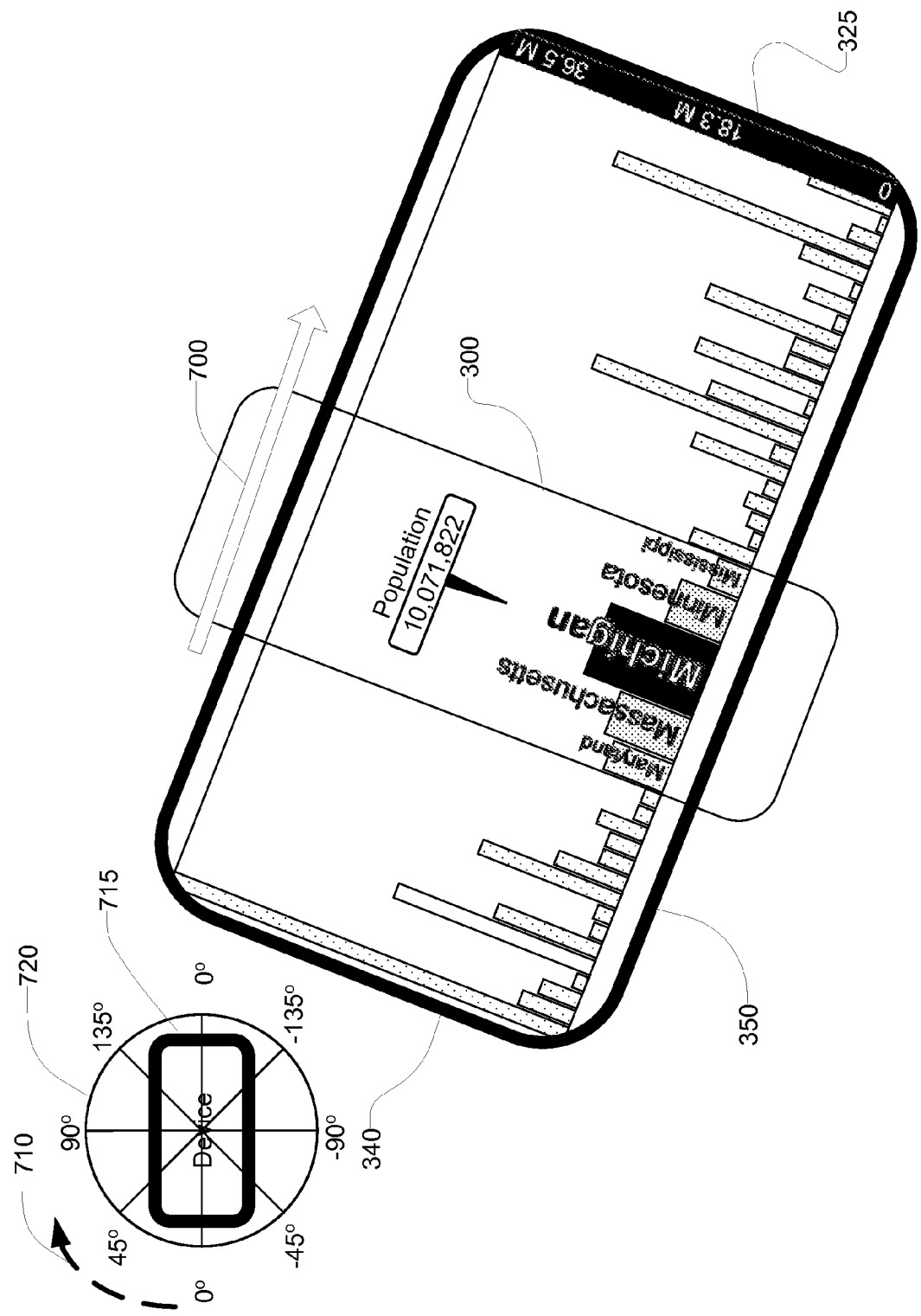
FIG. 7 shows how tilting a device displaying a bar graph in a particular direction causes the bar graph to scroll causing the bars displayed in the distortion region to change.
Figure 8:
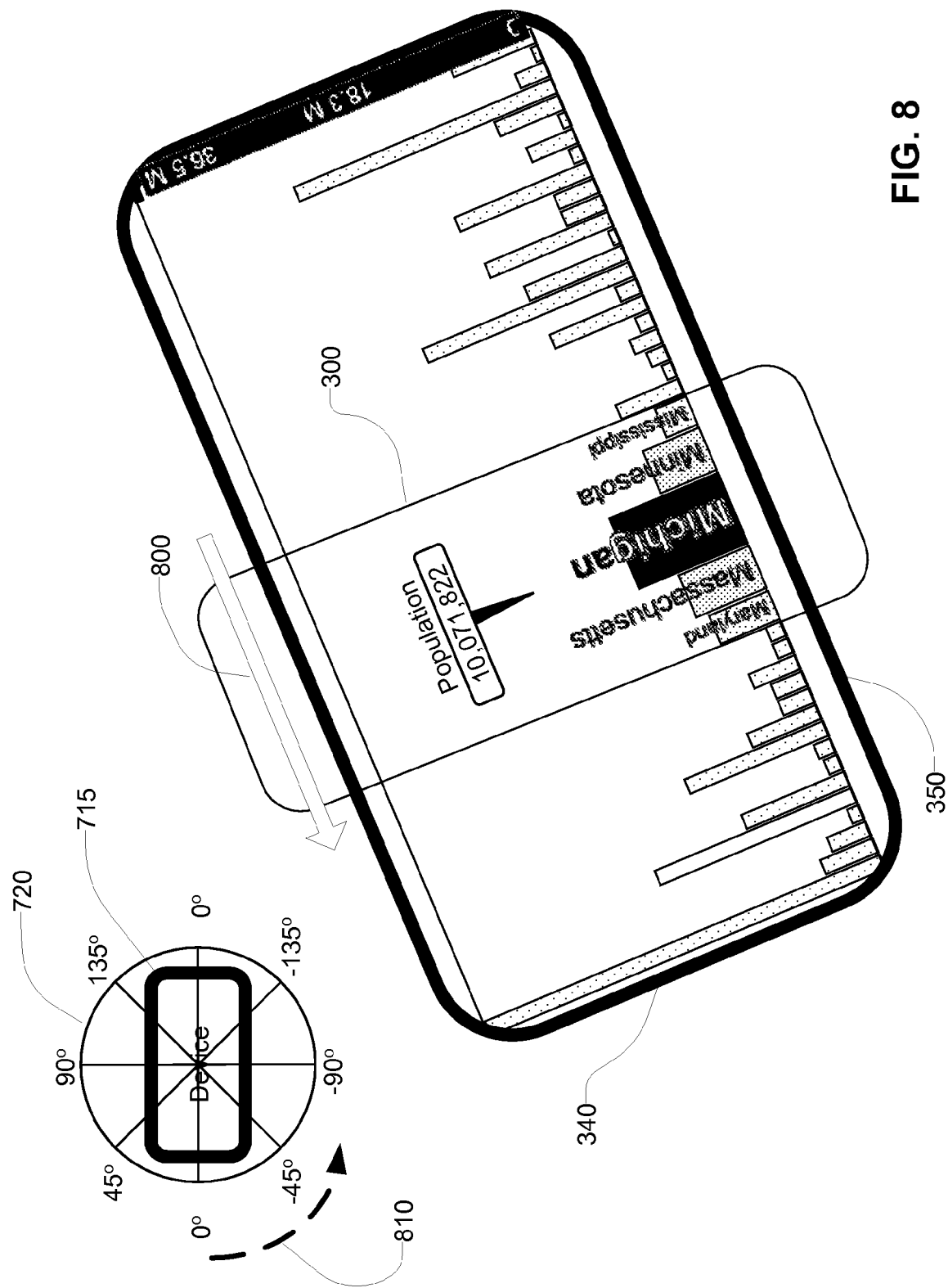
FIG. 8 shows how rotating a device in the direction opposite to that shown in FIG. 4 causes the bar graph to scroll in the opposite direction.

FIG. 7 illustrates an embodiment in which scrolling of the bar chart is controllable by tilting the display screen 225. The direction in which the bar chart scrolls is determined by the angle of tilt. The device 715 shown in FIG. 7 can be tilted along any of the angles drawn along the circle 720. The arrow 710 indicates that the angle of tilt is a positive angle less than 90°. As shown in FIG. 7, the tilt may cause the left edge 340 to be higher than the right edge 325. The tilt at the angle illustrated by arrow 710 causes the direction of scrolling of the bar chart to be 700. As the bar chart keeps scrolling, the bars displayed under the distortion region 300 keep changing. The user may choose to change the angle to tilt back to 0° to stop the scrolling action. Once the scrolling stops, the desired bar may already be under the distortion region 300 or be outside the distortion region 300 but within the display area. This allows the user to move the distortion region 300 to the desired bar or use an alternative mechanism to move the bar chart relative to the distortion region. FIG. 8 illustrates how the angle of tilt can be negative as shown by the arrow 810 causing the bar chart to scroll in direction 800, opposite to the direction 700.

In one embodiment, the speed of scrolling is determined by the magnitude of the angle of tilt. For example, in FIG. 7, if the angle of tilt 710 is selected to be 80°, the speed at which the bar chart scrolls is higher than the speed if the angle 710 was 10°. A user trying to reach a bar that is outside the display area and several bars away from the bars within the display area may start with a large angle of tilt to scroll fast towards the desired bar. The angle of tilt may be reduced as the desired bar gets closer to the display area. The angle of tilt is reduced to zero when the desired bar is within the display area causing the scrolling to stop. In certain embodiments, the speed at which the chart scrolls has a minimum or a maximum limit or both. For example, the smallest amount of tilt that is detected causes the chart to scroll at or above the minimum speed. Similarly, the maximum tilt, for example either 90° or −90°, does not cause the chart to scroll any faster than the maximum scrolling speed. The minimum and the maximum speed of scrolling of the chart can be predetermined for a system or configured by the user.

Figure 9:
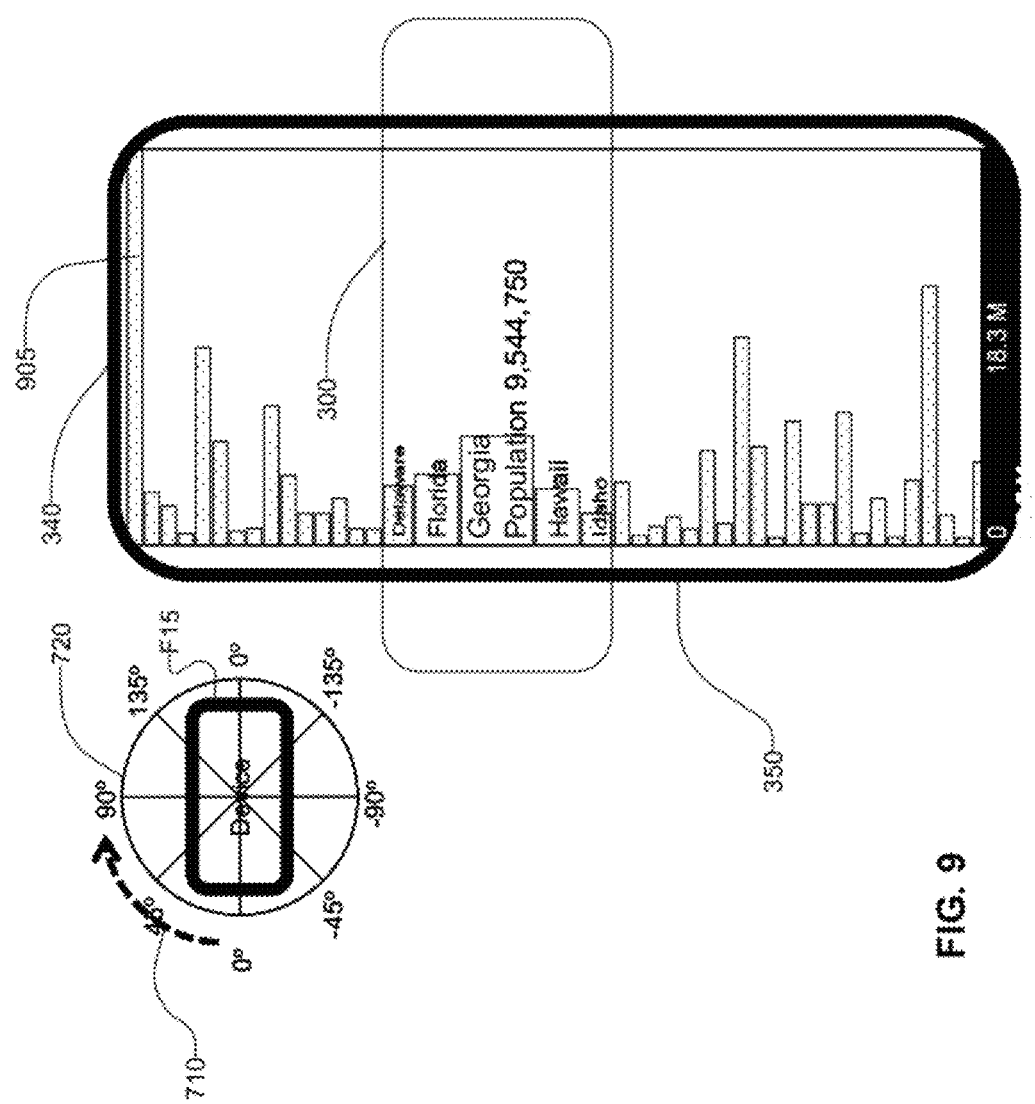
FIG. 9 shows how tilting a device displaying a bar graph at an angle of 90° causes the display to show the bars at the beginning of the x-axis.

As illustrated in FIG. 9, in certain embodiments, changing the angle of tilt 710 to an angle within a predetermined range of angles close to 90° causes the bar chart to directly move to the beginning of the bar chart corresponding to the smallest x-coordinate value 905 that needs to be displayed. As shown in FIG. 9, the bar corresponding to the smallest x-coordinate value 905 is displayed adjacent to the left edge 340 and the distortion region 300 is placed close to the middle of the bar chart being displayed. This behavior is an exception to the behavior described above, wherein the speed of scrolling of the bar chart is proportional to the magnitude of the angle. When the angle of tilt is large enough to be within a predetermined angle close to 90°, the user input causes the bar chart to directly move to the beginning of the bar chart instead of continuing to scroll. Similarly, if the angle of tilt is within a predetermined range of angles close to −90°, the end of the bar chart is displayed with the bar corresponding to the largest x-coordinate value that needs to be displayed.

Figure 10:
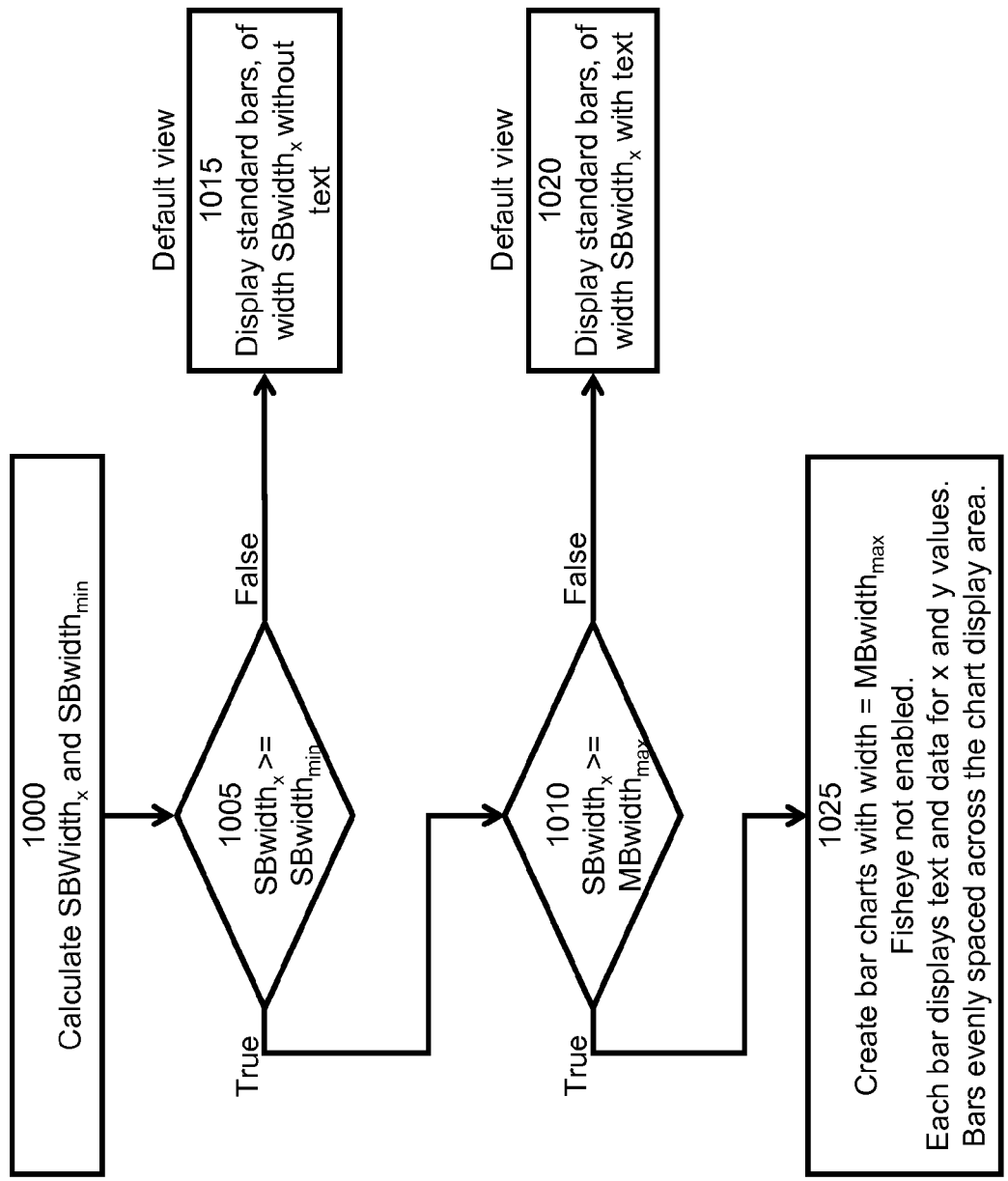
FIG. 10 shows a flowchart describing an embodiment of the process for calculating the bar width for displaying on a device with a distortion region.

The data renderer 215 determines the dimensions of the chart to be displayed on the display screen 225. In one embodiment, when the data is to be displayed as a bar chart, the dimensions associated with the chart are calculated as follows. FIG. 10 illustrates the process used to determine whether text is displayed on the standard bars or not. The bar width of standard bar is calculated 1000 using the following equation where CHARTwidth is the widths of the display screen 225 used for displaying the chart and num_dp is the total number of data points in the chart.

$$SBwidth_x = \frac{CHARTwidth}{num\_dp} \quad (1)$$

In some embodiments, $SBwidth_x$ is calculated by taking the maximum of the value $$\frac{CHARTwidth}{num\_dp}$$

and a predetermined constant value to avoid the value of $SBwidth_x$ becoming very small due to very large values of num_dp. Also, the minimum possible width of a standard bar that displays text $SBwidth_{min}$ is calculated 1000 as:

$$SBwidth_{min} = height_{min\_font} + 2*M \quad (2)$$

In equation (2) $height_{min\_hd\_font}$ is the height of the smallest font size that can be used to display the data labels and M is a predetermined value of the margin above and below the text, for example, 0.05 point size. Based on the computation of equation (2) a standard bar can display the labels corresponding to the values of the x-coordinates with a margin above and below the label. The standard bar width $SBwidth_x$ is compared 1005 with $SBwidth_{min}$. If the value of $SBwidth_x$ is smaller than $SBwidth_{min}$, the default view of the chart displays 1015 standard bars of width $SBwidth_x$ without any text. If the value of $SBwidth_x$ is at least as large as $SBwidth_{min}$, the value $SBwidth_x$ is compared 1010 with the width of the bar with maximum magnification in the distortion region $MBwidth_{max}$. The value of $MBwidth_{max}$ is calculated based on the height $height_{max\_font}$ of a font predetermined for displaying text in the bar with maximum magnification within the distortion region.

$$MBwidth_{max} = height_{max\_font} + 2*M_{max} \quad (3)$$

The value $M_{max}$ is the margin predetermined to be displayed above and below the text in the bar with maximum magnification within the distortion region. In an embodiment that displays additional information as text overlaid on the bar as shown in FIG. 4, the $height_{max\_font}$ in equation 3 can be replaced by the total height of the multi-line text 400 used to display the information. If the value of $SBwidth_x$ is at least as large as $SBwidth_{min}$ but smaller than $MBwidth_{max}$, the standard bars are displayed 1020 with width $SBwidth_x$ and with text of labels corresponding to the x-coordinate value of the bar. The font size of the text used in the standard bar in this case is determined based on the value of $SBwidth_x$ as follows:

$$height_{font} = SBwidth_x - 2*M \quad (4)$$

In this case, the bars are displayed with the default view of FIG. 1 unless user provides input that causes distortion region to be displayed such as by engaging a standard bar. If the value of $SBwidth_x$ calculated above is at least as large as $MBwidth_{max}$ the bar charts are created 1025 with a width of $MBwidth_{max}$ and distortion region is not used for magnifying bars. Furthermore, the bars are evenly spaced across the chart display area and each bar displays the text and data corresponding o its x-coordinate value and y-coordinate value.

The width of the magnified bars within the distortion region decreases with the distance of the bar from the bar 315 with maximum magnification. The distance between two bars can be calculated based on numbers of bars between the two bars in the bar chart. For example, as shown in FIG. 3, the distance between bars 315 and bar 370 can be considered 1 and the distance between the maximum magnification bar 315 and bar 375 can be considered 2. The width of a bar with distance k from bar 315 can be determined using the following equation assuming there are (m−1) bars on either side of the maximum magnification bar 315 within the distortion region.

$$MBwidth_x = (m-k)/m * MBwidth_{max} \quad (5)$$

For example, if there are two bars on either side of bar 315 in the distortion region as shown in FIG. 3, the value of m=3 and the bar 370 that is at a distance of one bar from bar 315 has width ⅔*$MBwidth_{max}$ and the bar 375 that is at a distance of two bars from 315 has width ⅓*$MBwidth_{max}$. In some embodiments, if the value of $MBwidth_x$ calculated by equation (5) is lower than a predetermined threshold value, a bar with width of the predetermined threshold value is displayed. The font size of the text displayed in the bars in the distortion region can be calculated based on the font size $height_{max\_font}$ by multiplying the value of $height_{max\_font}$ by a scaling factor based on the distance of the bar from the bar 315 of maximum width similar to equation (5). Accordingly, the font size of a bar that is at a distance of k bars from the bar 315 of the maximum magnification is $(m-k)/m * height_{max\_font}$. Alternatively the font size of a bar that is distance k from bar 315 is calculated to be $height_{max\_font} - (k * font_{delta})$ where, $font_{delta}$ is a predetermined constant value, for example, 4 points. For example, in FIG. 3, the font size of bar 370 that is at a distance of one bar from 315 is determined to be $height_{max\_font} - 4$ points and the font size of bar 375 that is at a distance of two bars from 315 is determined to be $height_{max\_font} - 8$ points based on the value of $font_{delta} = 4$ points. In an alternative embodiment, if the calculated value of the font size of a bar is below a predetermined threshold value, the text is displayed for the bar using the predetermined threshold value of font.

The x-axis in FIG. 3 is shown parallel to the bottom edge 350 and close to the bottom edge 350. The x-axis in FIG. 3 is close to the bottom edge because all the y-coordinate values corresponding to the bars are positive and are shown above the x-axis. In one embodiment, the maximum height of a bar is determined to be the same as the height of the area used to display the chart. The height Bheight$_x$ of any bar is determined by scaling the value appropriately based on the maximum height of the bars.

$$Bheight_x = \frac{height_{chart\_area}}{DP_{max}} * DP_x \quad (3)$$

In equation (3), the height$_{chart\_area}$ is the height of the chart area that corresponds to the maximum height of the bars, $DP_{max}$ is the value of the y-coordinate corresponding to the bar with maximum height, and $DP_x$ is the y-coordinate value corresponding to the bar for which the height Bheight$_x$ is being calculated.

If all the y-coordinate values corresponding to the bars are negative, all the bars have to be displayed below the x-axis. In this case, the x-axis can be displayed close to the top edge 345 of the display screen. The height of each bar is calculated by the following equation.

$$Bheight_x = \frac{height_{chart\_area}}{|DP_{min}|} * DP_x \quad (4)$$

The tallest bar corresponds to the minimum y-coordinate value $DP_{min}$. Since the $DP_{min}$ value is negative, equation (3) uses the absolute function, represented by $|DP_{min}|$ to compute a positive Bheight$_x$ value.

If the bar chart needs to display bars corresponding to both positive and negative y-coordinate values, some bar are displayed above the x-axis and some below the x-axis. In this case, the x-axis is displayed between the lower chart edge 355 and the upper chart edge 360 such that the bars can be displayed on either side of the x-axis. In one embodiment, the distance Xheight of the x-axis from the lower edge 355 is calculated based on equation (5):

$$Xheight = \frac{|DP_{min}| * height_{chart\_area}}{(|DP_{min}| + DP_{max})} \quad (5)$$

Essentially, the x-axis is displayed above the lower chart edge 355 such that the bar corresponding to y-coordinate value $DP_{min}$ can be displayed below the x-axis and the bar corresponding to the y-coordinate value $DP_{max}$ can be displayed above the x-axis. The height of a bar Bheight$_x$ in this case is calculated using the equation (6).

$$Bheight_x = \frac{DP_x * height_{chart\_area}}{(|DP_{min}| + DP_{max})} \quad (6)$$

In certain embodiments, the bar chart can be displayed such that the x and the y axes are transposed. For bar charts with a large number of data points to be displayed, it may not be possible to display all the bars corresponding to the data points at the same time on the display screen 225.

It is to be understood that the Figures and descriptions of the present invention have been simplified to illustrate elements that are relevant for a clear understanding of the present invention, while eliminating, for the purpose of clarity, many other elements found in a typical system that allows users to view report data. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method for displaying on a display screen of a mobile device a bar chart representing a plurality of data points, the method comprising:
   displaying a first set of bars on the display screen, each bar representing one of the plurality of data points and having a first width and a variable height according to a value of the represented data point;
   displaying a second set of bars on the display screen, each bar representing one of the plurality of data points and having a second width and a variable height according to a value of the represented data point, the second width being greater than the first width;
   displaying a third set of bars on the display screen, each bar displayed between bars of the first set and bars of the second set and representing one of the plurality of data points, and each having a third width and a variable height according to a value of the represented data point, the third width being greater than the first width and less than the second width; and
   responsive to receiving a user input, altering the display of at least one of the bars in the third set to have the first width, and altering at least one of the bars in the second set to have the third width.

2. The method of claim 1, wherein each bar has at least one associated label, and the label is not displayed for bars in the first set, and is displayed for bars in the second set.

3. The method of claim 2 wherein each bar has at least a second associated label, and the label is not displayed for bars in the third set, and is displayed for bars in the second set.

4. The method of claim 2 wherein each bar has at least a second associated label, and the label is not displayed for bars in the first set, and is displayed for bars in the second and third sets.

5. The method of claim 1, wherein the width of a bar in the second set of bars is determined based on an amount of information displayed for the bar.

6. The method of claim 1, wherein bars of the first set are displayed in a first color and bars of the second set are displayed in a second color.

7. The method of claim 6 wherein bars of the third set are displayed in a third color.

8. The method of claim 1, wherein bars of the first set are displayed in a first shading and bars of the second set are displayed in a second shading.

9. The method of claim 8 wherein bars of the third set are displayed in a third shading.

10. The method of claim 1, wherein the second set and the third set are displayed in a fixed region on the display.

11. The method of claim 1, wherein the second set and the third set are displayed in a moveable region on the display.

12. The method of claim 11, wherein altering the display further comprises moving the moveable region to incorporate the at least one of the bars in the first set.

13. The method of claim 1, wherein the second set of bars is displayed in a rectangular portion of the chart display area parallel to a bar displayed in the bar chart.

14. The method of claim 1, wherein the user input includes physically tilting the display screen.

15. The method of claim 14, wherein a rate at which the display is altered is dependent at least in part upon the degree of tilt of the display screen.

16. The method of claim 1, wherein the user input includes a swiping gesture across the display screen.

17. The method of claim 1, wherein a label determined to be displayed for a bar is displayed as a popup associated with the bar.

18. The method of claim 1, wherein a label determined to be displayed for a bar is displayed overlaying the bar.

19. The method of claim 1, further comprising:
   responsive to receiving a selection of a bar in the second set of bars, displaying a second chart associated with the selected bar.

20. A system for displaying on a display screen of a mobile device a chart representing a plurality of data points, the system comprising:
   a computer processor; and
   a computer-readable storage medium storing computer program modules configured to execute on the computer processor, the computer program modules comprising:
   an input/output driver module configured to:
      display a first set of bars on the display screen, each bar representing one of the plurality of data points and having a first width and a variable height according to a value of the represented data point;
      display a second set of bars on the display screen, each bar representing one of the plurality of data points and having a second width and a variable height according to a value of the represented data point, the second width being greater than the first width;
      display a third set of bars on the display screen, each bar displayed between bars of the first set and bars of the second set and representing one of the plurality of data points, and each having a third width and a variable height according to a value of the represented data point, the third width being greater than the first width and less than the second width; and
      responsive to receiving a user input, alter the display of at least one of the bars in the third set to have the first width, and alter at least one of the bars in the second set to have the third width.

21. A computer program product having a non-transitory computer-readable storage medium storing computer-executable code for displaying on a display screen of a mobile device a chart representing a plurality of data points, the code comprising:
   an input/output driver module configured to:
      display a first set of bars on the display screen, each bar representing one of the plurality of data points and having a first width and a variable height according to a value of the represented data point;
      display a second set of bars on the display screen, each bar representing one of the plurality of data points and having a second width and a variable height according to a value of the represented data point, the second width being greater than the first width;

display a third set of bars on the display screen, each bar displayed between bars of the first set and bars of the second set and representing one of the plurality of data points, and each having a third width and a variable height according to a value of the represented data point, the third width being greater than the first width and less than the second width; and responsive to receiving a user input, alter the display of at least one of the bars in the third set to have the first width, and alter at least one of the bars in the second set to have the third width.

22. The system of claim 20, wherein each bar has at least one associated label, and the label is not displayed for bars in the first set, and is displayed for bars in the second set.

23. The system of claim 22 wherein each bar has at least a second associated label, and the label is not displayed for bars in the third set, and is displayed for bars in the second set.

24. The system of claim 20, wherein the width of a bar in the second set of bars is determined based on an amount of information displayed for the bar.

25. The system of claim 20, wherein bars of the first set are displayed in a first color and bars of the second set are displayed in a second color.

26. The computer program product of claim 21, wherein each bar has at least one associated label, and the label is not displayed for bars in the first set, and is displayed for bars in the second set.

27. The computer program product of claim 26 wherein each bar has at least a second associated label, and the label is not displayed for bars in the third set, and is displayed for bars in the second set.

28. The computer program product of claim 21, wherein the width of a bar in the second set of bars is determined based on an amount of information displayed for the bar.

29. The computer program product of claim 21, wherein bars of the first set are displayed in a first color and bars of the second set are displayed in a second color.

* * * * *